Figure 2:
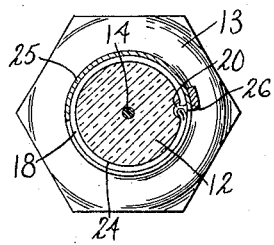

June 2, 1959

R. REICHHELM 2,889,440

SPARK PLUGS

Filed Nov. 23, 1956

INVENTOR
Robert Reichhelm
BY
ATTORNEYS

# United States Patent Office 2,889,440
Patented June 2, 1959

2,889,440

SPARK PLUGS

Robert Reichhelm, Wallingford, Conn.

Application November 23, 1956, Serial No. 624,021

5 Claims. (Cl. 219—19)

This invention relates to improvements in spark plugs, and more particularly to a spark plug for use with internal combustion engines, provided with means for insuring the starting of the engine particularly in cold weather.

It is sometimes difficult to start an internal combustion engine, particularly in cold weather, due to the fact that ice often forms on the spark plug and also due to the fact that the ignition points between which the spark passes may be fouled either by the presence of ice or carbon deposits or the like. Due to condensation in the gasoline when fed to the engine, it sometimes occurs, particularly when starting the engine in cold weather, that the liquid gas does not vaporize and also is ignited only with difficulty by the spark. It also often occurs that ice forms between the electrodes and prevents the generation of the spark to ignite the gas.

Also it sometimes occurs that ice or moisture forms on the upper exposed portion of the spark plug, usually of porcelain or similar material, and the current passing through the plug is thereby short-circuited so as to pass from a metallic grounded portion of the plug to the contact post at the upper portion thereof instead of passing through the electrodes at the lower end of the plug. In extreme weather this condensation often freezes and the ice resulting therefrom on the upper exposed portion of the plug will short-circuit the current.

It is contemplated by the present invention to provide a spark plug of improved construction which will be provided with a heating coil at the inner end of the plug so as to maintain the electrodes in an ice- or moisture-free condition when a current is passed through this coil and also prevent the fouling of the plugs by deposits of carbon or the like. In addition the upper exposed portion of the plug is also provided with a heating coil which, when a current is passed therethrough, will free this portion of the plug from formations of ice or moisture so that the current passing to the sparking electrodes of the plug will not be short-circuited.

The two coils, one adjacent the upper and one at the lower end of the plug, are connected together in the same circuit which is a circuit independent of that leading to the electrodes of the plug so that it may be turned on and off when desired, and when used will prevent the formation of moisture on the plug and will heat the fuel gas adjacent the electrodes and thus facilitate the starting and operation of the engine.

One object of the invention is to provide a spark plug for internal combustion engines provided with a resistance heating coil adjacent the electrodes of the plug to effect heating of the fuel gas at this point and free the electrodes from moisture or ice.

Another object of the invention is to provide a spark plug having a heating coil upon the upper exposed portion thereof which will maintain the upper portion of the plug free from formation of ice or moisture during the starting of the engine.

Still another object of the invention is to provide a spark plug of improved form having a heating coil at the lower end thereof adjacent the electrodes of the plug and also a heating coil around the upper exposed portion of the plug, the two coils being connected in the same circuit and being of resistance material so that they will be heated when a current is passed therethrough.

To these and other ends the invention consists in the novel features and combinations of parts to be hereinafter described and claimed.

Figure 1:
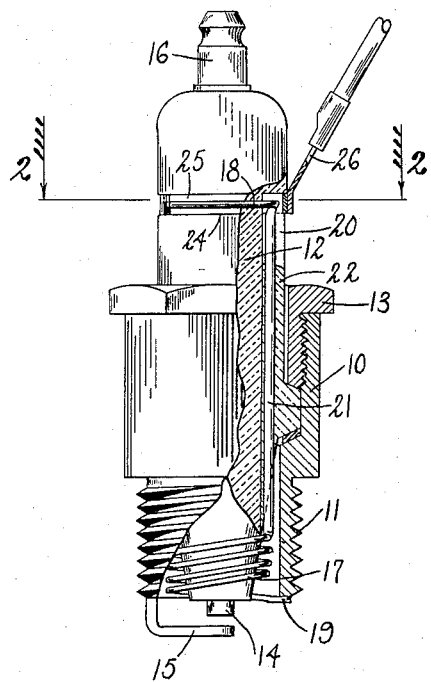

In the accompanying drawings:

Fig. 1 is an elevational view, partly in section, of a spark plug embodying my invention; and Fig. 2 is a sectional view on line 2—2 of Fig. 1.

To illustrate an embodiment of the invention there is shown on the drawing a spark plug comprising an outer metallic shell or body 10 provided with screw threads 11 by which it may be secured to the engine head in the usual manner. Within the shell 10 is the usual barrel 12 of porcelain or the like which is held in place by the gland nut 13 threaded into the shell 10.

The spark plug is provided as is usual with a central electrode 14 and a cooperating electrode 15 leading from the threaded portion of the shell 10 so that this electrode will be grounded upon the engine as is usual. A spark gap exists between the electrodes 14 and 15 to create the spark to ignite the fuel gas. The electrode 14 extends upwardly through the porcelain barrel 12 and is provided with a binding post 16 at the upper end of the plug through which the current from the ignition coil may be delivered as is usual.

In order to insure that the upper portion of the plug and also the electrodes 14 and 15 be maintained free from moisture or ice during the starting of the engine and to prevent the formation of deposits on the electrodes which would prevent the generation of a good spark, there is provided a heating coil 17 about the lower end of the plug and also a coil 18 at the upper exposed portion thereof.

The coil 17 may be of several turns and may be wrapped around the lower portion of the porcelain barrel 12 and the lower end of this coil connected at 19 to the threaded portion 11 of the shell 10 so that it will be grounded upon the engine. It will be understood that this coil 17 will be of relatively fine wire so that it will readily heat.

The porcelain barrel 12 of the plug is provided with a longitudinally extending groove or recess 20 opening through its outer surface, and within this groove is a conducting wire 21 connected at its lower end to the coil 17 and connected at its upper end to the coil 18. It will be understood that the conducting wire will preferably be of larger diameter than the wire of the coil 17 so as to serve as a good conductor to supply current to the latter. The groove 20 may be packed or filled, about the wire 21, with cement or similar material 22 so that the compression of the engine will not be lost.

As stated, the upper end of the wire 21 is electrically connected to the coil 18. This coil will also be of wire of relatively small diameter so as to serve effectively as a heating coil and may be lodged in an annular groove 24 formed peripherally of the upper portion of the barrel 12. This groove communicates with the upper end of the longitudinal groove 20 so that the coil 18 may be connected to the wire 21. While as shown the coil 18 consists of only a single turn, it may be formed of a multiplicity of turns if desired. Extending around the coil 18 and in electrical contact therewith is a band 25 of metal or other electrical conducting material to which is connected a conducting wire 26 leading to a source of electrical current such as the battery of the car. This band may if desired be in the form of a split band or a substantially semi-circular spring clip which will bind against the coil to conduct current thereto by its resilience and which may be readily removed when desired. The conducting wire 26 may lead to a switch so that the battery current may be turned on when desired to flow through the coils 17 and 18.

From the above it will be apparent that when the switch is turned on, current will be introduced into the coil 18, and through the conducting wire 21 to the coil 17 and thence through the connection 19 to the shell 10 of the spark plug which, as stated, is grounded upon the engine. The circuit through the coils will thus be completed to heat the same, and it may be noted that this circuit is independent of that which serves the electrodes 14 and 15. Therefore, the heating coils may be employed when desired and cut off when desired independently of the operation of the ignition system of the engine.

The coil 18 at the upper portion of the plug serves to evaporate any moisture or condensation upon this part of the plug and maintains the surface thereof free from moisture or ice and, therefore, prevents the short-circuiting of the ignition current between the binding post 16 and the nut 13 which would short-circuit the electrodes. The heat generated by the coil 18 will, of course, be imparted to the band 25 and thence to the exterior surface of this portion of the plug.

While I have shown and described one embodiment of my invention, it will be understood that it is not to be limited to all of the details shown, but is capable of modification and variation within the spirit of the invention and within the scope of the claims.

What I claim is:

1. A spark plug having an outer metallic shell, a barrel of insulating material within the shell and projecting upwardly therefrom, cooperating electrodes on the lower ends of the shell and barrel, said barrel having spaced heating coils of high resistance wire extending therearound, one adjacent the lower end thereof within the barrel and near the electrodes, and one adjacent the upper end of the barrel above the shell, a conducting wire of greater diameter than that of said coils extending longitudinally of the barrel and connecting the two coils electrically, and means for passing a current through said coils and conducting wire.

2. A spark plug as in claim 1 wherein the barrel is provided with a longitudinal groove, and said conducting wire extends through said groove between the coils.

3. A spark plug as in claim 1 wherein the barrel is provided with a longitudinal groove through which said conducting wire extends between the coils, and also with an annular circumferential groove in which said upper coil is disposed below the surface of the barrel, which circumferential groove communicates with the longitudinal groove at the upper end of the latter.

4. A spark plug having an outer metallic shell, a barrel of insulating material within the shell and projecting upwardly therefrom, cooperating electrodes on the lower ends of the shell and barrel, said barrel having spaced heating coils of high resistance wire extending therearound, one adjacent the lower end thereof within the barrel and near the electrodes, and one adjacent the upper end of the barrel above the shell, a conducting wire of greater diameter than that of said coils extending longitudinally of the barrel and connecting the two coils electrically, said barrel being provided with an annular groove within which said upper coil is disposed, a band lying within said groove around said coil and in electrical contact therewith, and a current-carrying wire connected to said band to pass a current through said coils.

5. A spark plug having an outer metallic shell, a barrel of insulating material within the shell and projecting upwardly therefrom, cooperating electrodes on the lower ends of the shell and barrel, said barrel having spaced heating coils of high resistance wire extending therearound, one adjacent the lower end thereof within the barrel and near the electrodes, and one adjacent the upper end of the barrel above the shell, a conducting wire of greater diameter than that of said coils extending longitudinally of the barrel and connecting the two coils electrically, said barrel being provided with an annular groove within which said upper coil is disposed, a split resilient metal band around said coil and in electrical contact therewith, and a current-carrying wire connected to said band to pass a current through said coils, said band lying in said groove so as to be substantially flush with the periphery of the barrel.

References Cited in the file of this patent

UNITED STATES PATENTS

| | | |
|---|---|---|
| 1,364,262 | Faber | Jan. 4, 1921 |
| 2,331,029 | Hopkins | Oct. 5, 1943 |
| 2,646,783 | Coughlin | July 28, 1953 |
| 2,665,672 | Coughlin | Jan. 12, 1954 |